(12) United States Patent
Dunajtschik et al.

(10) Patent No.: US 8,662,007 B2
(45) Date of Patent: Mar. 4, 2014

(54) METHOD AND DEVICE FOR THE CONTINUOUS COATING OF CORES BY MEANS OF A DRAGEE MAKING APPARATUS

(75) Inventors: Rudolf Dunajtschik, Friedrichshafen (DE); Oliver Nohynek, St. Gallen (CH)

(73) Assignee: Driam Anlagenbau GmbH, Eriskirch/Bodensee (DE)

( * ) Notice: Subject to any disclaimer, the term of this patent is extended or adjusted under 35 U.S.C. 154(b) by 94 days.

(21) Appl. No.: 13/023,200

(22) Filed: Feb. 8, 2011

(65) Prior Publication Data

US 2011/0287166 A1 Nov. 24, 2011

Related U.S. Application Data

(62) Division of application No. 10/566,894, filed as application No. PCT/EP2004/008582 on Jul. 30, 2004, now Pat. No. 7,955,643.

(30) Foreign Application Priority Data

Aug. 1, 2003 (DE) ................................. 103 35 411
Jan. 28, 2004 (DE) ........................ 10 2004 004 470

(51) Int. Cl.
*B05C 3/08* (2006.01)

(52) U.S. Cl.
USPC .................. 118/19; 118/23; 118/24; 118/30; 118/418; 99/494

(58) Field of Classification Search
USPC .............. 118/13, 19, 23, 24, 30, 418; 99/494; 366/294, 298
See application file for complete search history.

(56) References Cited

U.S. PATENT DOCUMENTS

| | | | | |
|---|---|---|---|---|
| 2,336,298 | A | * 12/1943 | Rubens et al. | .................. 118/19 |
| 2,787,978 | A | * 4/1957 | Faerber | ............................ 118/19 |
| 3,390,648 | A | 7/1968 | Martin | |
| 4,487,160 | A | 12/1984 | Frankish | |
| 4,676,187 | A | 6/1987 | Grabowski | |

FOREIGN PATENT DOCUMENTS

| | | |
|---|---|---|
| CA | 2189400 A1 | 5/1997 |
| DE | 12 74 475 B | 8/1968 |
| DE | 23 24 946 A | 12/1974 |
| DE | 33 45 089 C1 | 6/1984 |
| DE | 33 45 089 C2 | 6/1984 |
| DE | 195 18 721 A1 | 11/1996 |
| DE | 195 40 799 C1 | 2/1997 |
| JP | 49-42589 | 11/1974 |
| JP | 62-236548 | 10/1987 |
| JP | 2003183969 * | 7/2003 |
| WO | 03/0 47 362 A1 | 6/2003 |

OTHER PUBLICATIONS

Summary of Japanese Office Action. citing JP49-42589 for which no Abstract is currently available in English, (Feb. 2010).

* cited by examiner

*Primary Examiner* — Laura Edwards
(74) *Attorney, Agent, or Firm* — Christa Hildebrand; Cheryl F. Cohen

(57) ABSTRACT

Disclosed is a method for continuously coating cores by means of a dragée-making apparatus (15) comprising at least one rotatably driven drum (1) in which the product (5) is coated with one or several coating materials or is subjected to other treatment processes, such as spraying, drying. In order to be able to individually treat several small charges within a very limited space and with little effort regarding machines, the charge of the product that is to be processed is divided into small individual charges at the inlet end of the drum, is conveyed through the drum in a clocked manner, and is treated in individual treatment chambers (7, 8, 9, 10, 11, 12, 13) in the drum, which are separated from each other. The longitudinal conveyor (3) that conveys the individual charges through the drum embodies the individual treatment chambers in connection with the inner wall of the drum. The products that are to be treated constantly rotate in the revolving drum without being conveyed in the longitudinal direction, the longitudinal conveyor located in the drum conveying the product from one treatment station to the next as required. Additionally, a passage is formed from one chamber to the adjacent, other chamber if necessary.

3 Claims, 14 Drawing Sheets

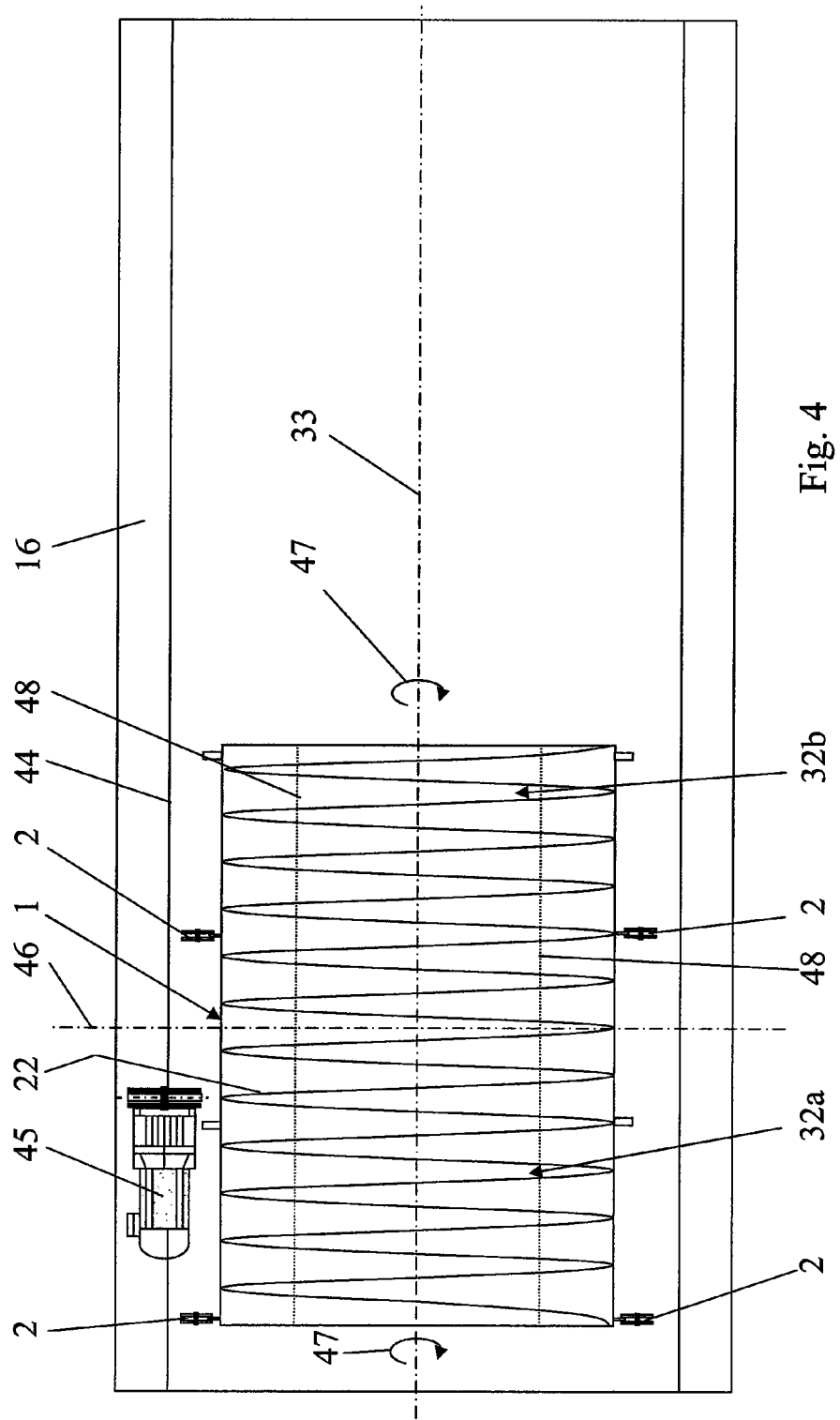

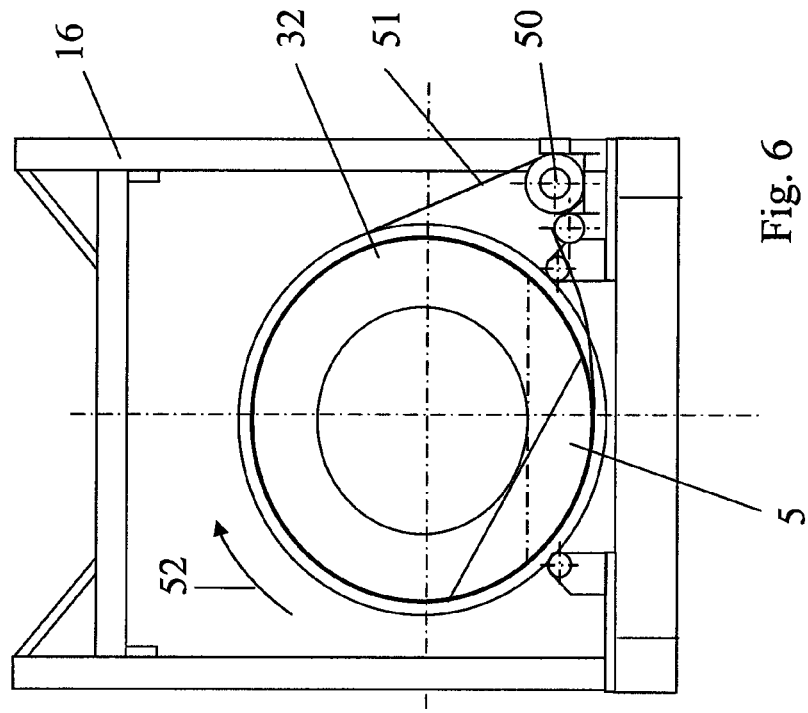
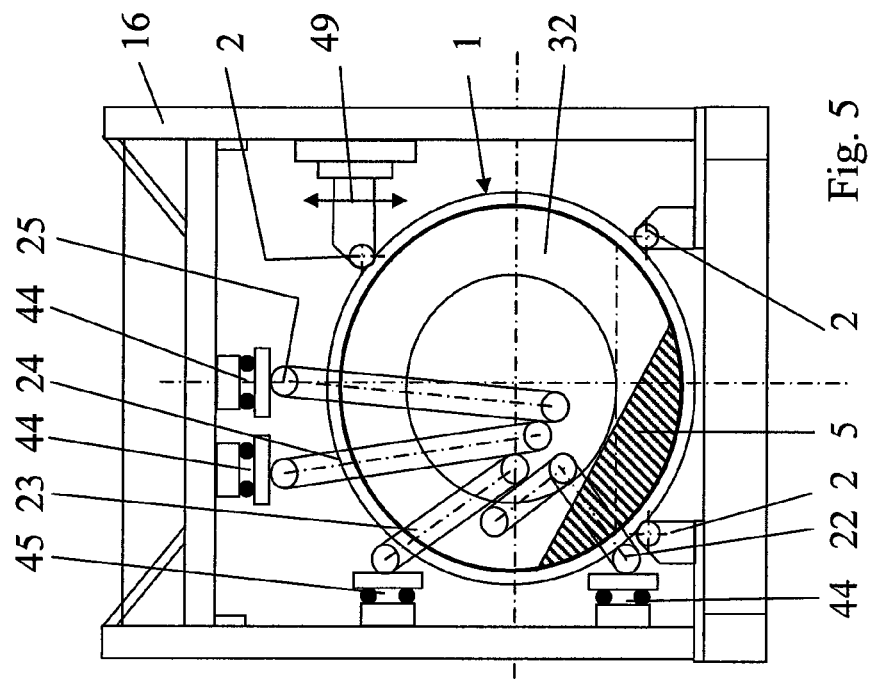

METHOD AND DEVICE FOR THE CONTINUOUS COATING OF CORES BY MEANS OF A DRAGEE MAKING APPARATUS

CROSS-REFERENCE TO RELATED APPLICATIONS

This is a divisional of Ser. No. 10/566,894 filed May 14, 2007, now U.S. Pat. No. 7,955,643, which is an application filed under 35 USC §371 of PCT/EP2004008582, filed on Jul. 30, 2004, claiming priority to DE 103 35 411.5 filed on Aug. 1, 2003 and DE 10 2004 004 470.8 filed on Jan. 28, 2004.

BACKGROUND OF THE INVENTION (1) Field of the Invention

The invention relates to a method and an apparatus for continuous coating of cores with a dragée-making apparatus including at least one rotatably driven drum in which the product is coated with one or several coating materials or is subjected to other treatment processes, for example spraying, drying and the like.

(2) Description of related Art

In general, the dragée technology differentiates between two different operating modes.

The first operating mode relates to a continuous dragée process, wherein the product to be treated is supplied at the inlet side of a rotating drum and transported toward the outlet side by transport ribs, which are non-rotatably attached to the inner wall of the drum.

The product stream inside the drum is always processed in a single process step, with several process steps performed consecutively. The product is transported continuously through rotation of the drum from the inlet side to the outlet side.

The conventional dragée process advantageously transports the product stream continuously. However, if only small product quantities are to be processed, then this continuous process is expensive and complex. In addition, the charges in a passage through the apparatus are limited.

A second conventional dragée process employees a discontinuous operating mode. A single charge is introduced in a drum and subjected to a specified process flow. The process is performed in relatively small-capacity vessels.

The charge is removed at the end of the process step and introduced into an additional drum for performing the next process step.

Stepwise processing the charge in different, consecutively arranged drums requires complex machinery.

It is known to reduce the throughput times in these conventional batch processes by arranging several drums along the periphery of a circular table and by arranging a number of stationery processing stations opposite the circular table.

The corresponding drum containing the charge is then moved to the respective processing station by rotating the circular table, where the charge is then processed.

At the end of this process step, the circular table is rotated again, and the next drum engages with the associated processing station.

This batch process is complex, in particular, if a large number of process steps are required, because a large number of drums must be arranged on a circular table. However, with this process, even small individual charges can advantageously be processed effectively.

It is therefore an object of the invention to improve the initially described process by providing a process and an apparatus for continuous coating of cores with a dragée apparatus, so that also relatively small individual charges can be processed in a small space using simple machinery.

BRIEF SUMMARY OF THE INVENTION

The object of the invention is solved by the process according to the technical teaching of claim 1.

With the invention, the advantages of a continuous process flow are maintained, while it becomes feasible for the first time to separate relatively small individual charges individually in separate processing chambers in the rotating drum and to also process these separate charges individually.

The invention is based on the concept that the transport motion is implemented by using a spiral which is decoupled from the rotary motion of the drum. The spiral performs a clocked, cyclical rotation so that the products can remain in the individual stations inside the drum for any length of time, without detrimentally moving in the longitudinal direction. The spiral is moved only when the products are to be transported to another processing station inside the drum.

The products to be processed continuously rotate in the rotating drum without being transported in the longitudinal direction. Only the longitudinal conveyor arranged in the drum transports the product from one processing station to the next.

With the invention, the residence time of the products can advantageously be extended to any length and the process can be better tailored to individual situations than with conventional dragée drums, where changes to the process are difficult and limited.

The following advantages arise:

A longitudinal conveyor (for example, a spiral) which is decoupled from the rotary motion of the drum transports the material in the axial direction through the drum in a clocked or cyclical transport mode. Such longitudinal conveyor can preferably be implemented as a spiral conveyor or a rotating drive.

Depending on the number of conveying elements of the longitudinal conveyor, which define the processing stations in the drum, an arbitrary number of processing stations can be arranged in the drum.

The processing stations can be moved and/or adjusted depending on the mutual spacing between the individual conveying elements (pitch of the spiral conveyor).

The spiral conveyor may also have a changing or different pitch along its length, so that for example a relatively wide, large-area bed for the cores to be processed is formed in a processing chamber located at the inlet side of the drum, whereas the area of the bed is reduced when the material is transported toward the outlet side of the drum, which correspondingly increases the height of the bed. The spiral conveyor hence has a different pitch along its length.

More than one longitudinal conveyor driven in the axial direction may move through the drum. In an advantageous embodiment, two independently driven rotating spiral conveyors may be arranged in the drum, wherein the material processed by one spiral, i.e. the front spiral, is transferred to the inlet side of the following second spiral in the intermediate space between the two spirals.

Preferably, the drum is supported and driven by rollers.

The material to be processed can be supplied to the individual processing chambers inside the drum from both sides of the drum.

One or several processing stations may be arranged on a carriage which is stationery in the housing but movable relative to the drum in the axial direction, with the processing stations being configured so as to move into and out of the drum.

As an additional advantage, ease of cleaning of the drum should be mentioned: Because the spiral conveyor (as a separate element) can be completely removed from the drum, the interior space of the drum can be quite easily cleaned due to the absence of built-in structural components.

When the spiral conveyor is stopped and the drum rotates, the cores to be processed can remain in the processing stations for any length of time while being processed. The material is particularly thoroughly processed in the processing station while the drum rotates. This represents a significant advantage over the mixing drum mentioned at the beginning, where the material is forcibly transported in the axial direction during each revolution of the drum, without allowing the material to remain for a longer period of time at one location of the drum.

The technical teachings of the invention propose for the first time a meaningful linkage between continuous processing and batch processing.

To simplify the description, an exemplary embodiment of the aforedescribed longitudinal conveyor in the form of a spiral conveyor will now be described. However, this is not intended to limit the scope of the invention, since the invention encompasses all conventional longitudinal conveyors, which can form functionally separated processing chambers between the individual conveyor elements for receiving individual charges of the material to be processed.

Unlike with a conventional continuously operating apparatus, the product bed is divided into several individual charges and is transported through the drum by the cyclical spiral conveyor in the form of several small charges. The spiral conveyor must therefore be supported independently of the rotary drive of the cylindrical drum. The individual coating materials are applied at freely selectable positions and in freely selectable quantities in the region of the individual processing chambers formed by the spiral conveyor.

At the various positions, for example, the process steps "spraying", "feeding and distributing" and "coating" are performed.

With the novel process, the soft-dragée process can advantageously be more easily changed and adapted while the process is running. Whereas in conventional processes additional process steps sometimes have to be performed manually, the process flow of the process of the invention can be configured over much greater operating ranges.

Advantageously, the drum is rotatably supported on a roller bearing, and can be driven either by the rollers or by the torque produced by an endless chain or an endless toothed belt extending around the drum.

Two different embodiments are proposed for rotatably supporting the spiral conveyor.

According to a first embodiment, the rotary bearing of the spiral conveyor can be implemented as a spider bearing which is rotatably supported on the drum itself, so that the spiral conveyor always moves coaxially in relation to the drum.

According to another embodiment, the spiral conveyor can be non-rotatably connected with a shaft which passes through the drum in coaxial alignment therewith, wherein the shaft is rotatably supported on stationary bearings.

The spacing between the outside circumference of the spiral conveyor and the inside circumference of the drum should be as small as possible.

For example, a gap between the drum and the outside circumference of the spiral of approximately 1 mm is desirable for processing of cores having a diameter in a range between 15 and 20 mm.

It will be understood that the invention is not limited to the listed dimensions. The goal is to prevent damage to the cores to be processed in the gap between the drum and the separately supported spiral conveyor.

Alternatively, stripping or sealing strips which contact the inside of the drum can be arranged on the outer periphery of the spiral conveyor. The inside wall of the drum can then be cleaned during the rotary motion of the spiral conveyor. Such sealing strips can be implemented as profile strips, elastomer strips, brush strips, or as an air curtain.

The first half of the spiral conveyor can also have a smaller pitch along its length, while the second half has a greater pitch. This arrangement affects the transport path of the product during rotation of the spiral conveyor.

The aforedescribed process still has the advantages of a continuous process, while allowing relativity small individual charges to be separated in separate processing chambers inside the rotating drum, where they cab be individually processed.

The following embodiment is based on the concept transporting relativity small individual charges intermittently in individual, separate processing chambers of a rotating drum. It is proposed in this modification to implement a longitudinal conveyor such that material is transported from one chamber to an adjacent chamber only when desired.

This object is solved according to the invention by opening the partition disks, which separate the individual chambers from each other and are non-rotatably connected with the drum wall, only when desired to enable transfer from one chamber to the next.

To open a passageway in a corresponding partition disk, a change-over or feed flap is used which sealingly covers the unobstructed width of the mixing space, so that the material entrained along the wall of the drum is transported into the next chamber based on a displacement of the feed flap.

According to a core aspect of the invention, the conveyor disks, which separate the individual chambers from each other, operate as longitudinal conveyors only when desired and for a defined period of time to provide a longitudinal transport motion.

Advantageously, according to this technical teaching, spiral conveyors, which are decoupled from the drum wall and independently driven from the drum wall, are no longer used, but are replaced by mutually parallel, spaced-apart partition disks which are fixedly connected with the drum wall and define a corresponding processing chamber between each two disks.

A passageway is opened in the corresponding partition disk only when desired, i.e., when the product is to be transported from one chamber to the next. The opening element (e.g., a change-over flap) transports the material stream disposed in one chamber to the adjacent chamber, as soon as the drum has performed a complete revolution.

According to the invention, this improved embodiment operates with a less complex apparatus by eliminating a spiral which is driven independent from the drum.

It is only necessary to provide in each partition disk a corresponding passageway with a pivoting baffle which, preferably sealingly, closes the passageway.

In the operating position of the drum, i.e., when each of the chambers processes an individual charge, the pivoting baffle is closed and hence forms a wall of the partition disk. This prevents material from passing from one chamber to the next through the partition disk.

Conversely, when the material is to be transported to the adjacent chamber after having been processed individually in one chamber, all pivoting baffles in all the partition disks are moved into their open position, thereby opening a passageway in the partition disks.

The pivoting baffle simultaneously operates as a longitudinal conveyor through the passageway. For this purpose, the pivoting baffle fills the unobstructed width of the individual chamber, preferably sealingly, and operates as a deflection flap to transfer the material disposed along the drum wall through the passageway into the next chamber.

After the corresponding pivoting baffle between the next chamber and the adjoining additional chamber is also opened, the material from the adjacent chamber is also transferred through the corresponding pivoting baffle and the open passageway to the additional chamber during the same drum revolution.

Accordingly, when all pivoting baffles are open, all charges are transported onward from all chambers by exactly one cycle during a single revolution of the drum, thus entering the respective adjoining additional chamber in the transport direction.

The chamber at the outlet end also has a corresponding pivoting baffle in the delivery direction, which transfers the material in the last chamber to a delivery conveyor.

The subject matter of the present invention is not limited to the features of the individual claims, but also to features resulting from a combination of the individual claims.

All descriptions and features of the specification, including the abstract, in particular the spatial configuration depicted in the drawings, are part of the invention, as long as these are novel over the state of the art, either alone or in combination.

BRIEF DESCRIPTION OF THE DRAWINGS

The invention will now be described with reference to several embodiments depicted in the drawings. Additional features and advantages of the invention can be inferred from the drawings and the accompanying description.

FIG. 4 shows schematically the first embodiment of the dragée apparatus, FIG. 5 shows a view of the front end of the dragée apparatus of FIG. 4, FIG. 6 shows a view of the opposite end of the dragée apparatus of FIG. 5.

DETAILED DESCRIPTION OF THE INVENTION

Figure 1:
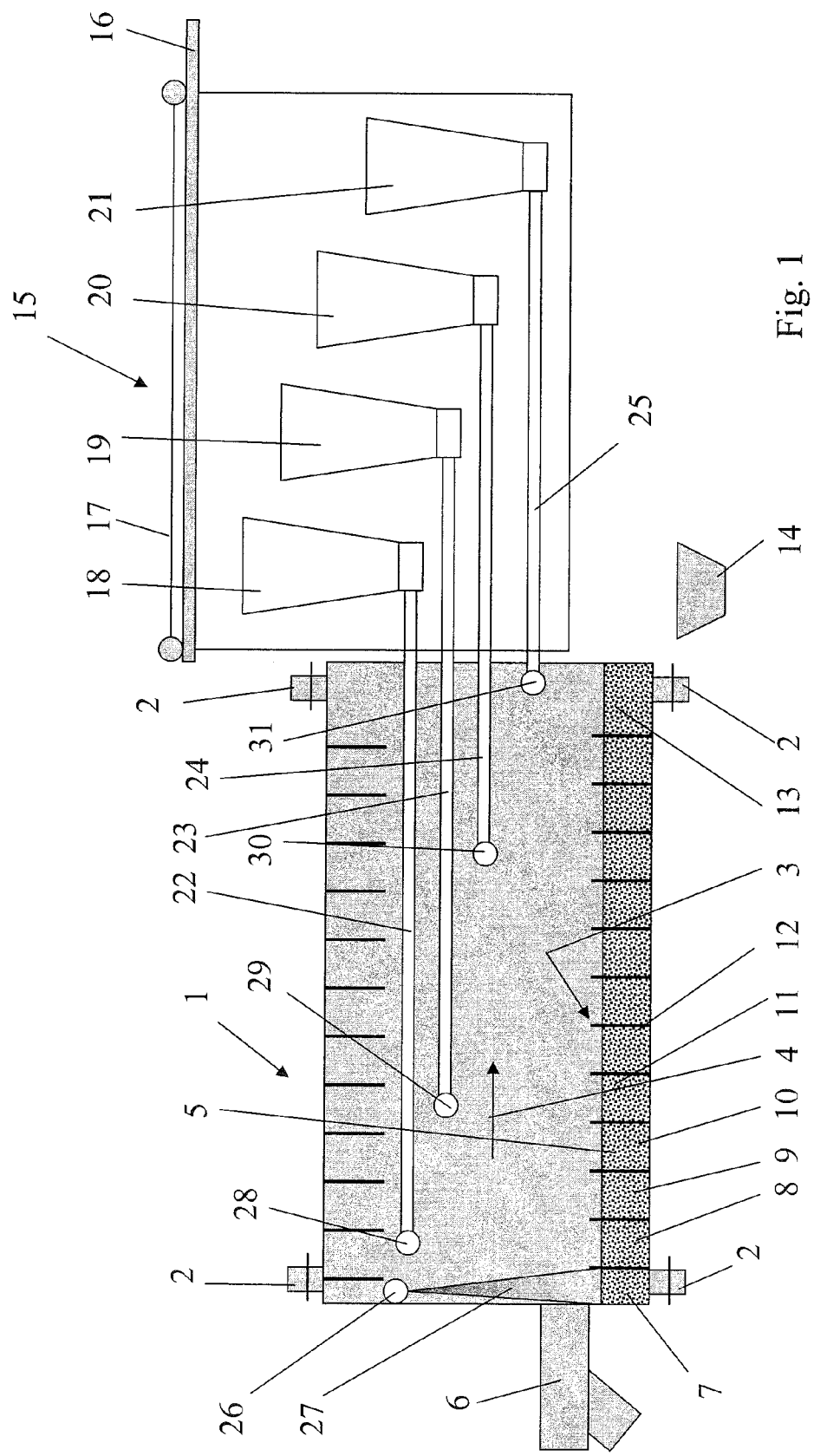
FIG. 1 shows schematically a dragée apparatus according to the invention with a longitudinal conveyor implemented as a spiral conveyor.

FIG. 1 shows in general a rotatably driven drum 1, with roller bearings 2 disposed on the outer periphery, which form the rotary bearing for the drum. The rotary drive for the drum is not shown.

Only schematically shown is a longitudinal conveyor 3 which separates the product 5 introduced on the inlet side via the feed belt 6 in the direction of arrow 4 into a number of individual charges.

The longitudinal conveyor 3 is shown only schematically by depicting only individual, mutual parallel conveyor elements. This is meant to indicate that the longitudinal conveyor 3 can be implemented either as a spiral conveyor 32 according to FIG. 2, or as an endless conveyor (disk conveyor 40) according to FIG. 3.

The invention can employ any type of longitudinal conveyor 3 capable of forming functionally separate processing chambers 7-13 between the conveyor elements.

The product 5 is introduced into the first processing chamber 7 via the feed belt 6 as a single charge, where the product is, for example, processed by a spray cone 27 from a processing head 26. The drum 1 rotates during processing, whereas the longitudinal conveyor 3 is stopped.

At the end of the required processing time in the processing chamber 7, the longitudinal conveyor 3 is activated, with the drum 1 either stopped or rotating, and transports with its transport element the product processed in processing chamber 7 to the following processing chamber 8.

The processing chamber 7 then becomes available, and a new charge is introduced into the processing chamber 7 via the feed belt 6.

The product can then be further processed in processing chamber 8, for example, by the processing head 28, wherein for example a coating material is supplied to the processing head 28 via a supply line 22 disposed at the outlet of a silo vessel 18.

The individual charge is then further processed in processing chamber 8, while the additional charge introduced via the feed belt 6 is further processed, as described above, in the processing chamber 7.

When both processes in processing chambers 7 and 8 are concluded, the longitudinal conveyor is again moved by one cycle in the direction of arrow 4, so that the front elements move in the axial direction through the drum 1. The product previously contained in processing chamber 8 then moves into the adjacent processing chamber 9, where the product is, for example, only mixed, because this processing chamber lacks an associated processing head.

At the same time, a new product is again filled into the processing chamber 7 via the feed belt 6, and the product previously contained in processing chamber 7 is transported into the processing chamber 8.

Each individual charge is thereby moved cyclically into each of the processing chambers 7-13, and the product is further coated or processed in certain processing chambers (e.g., processing chamber 12) by a processing head 29 associated with that processing chamber.

Additional processing heads 30, 31 are associated with the processing chambers located further downstream, whereby each processing head 28-31 is connected via a corresponding supply line 22-25 with an associated silo vessel 18-21.

According to the depicted embodiment, all processing stations are arranged on a carriage 17 which is movably supported on a stationary frame 16. The entire processing apparatus 15 can therefore be moved in and out of the drum.

Because of the processing apparatus 15 is movable, processing can be selectively performed in different processing chambers. For example, if processing takes place in processing chambers 8, 12 and so on, then the processing apparatus 15 can be moved to process the product with the processing head 28 in processing chambers 9 or 10, while the processing head 29 is moved downstream by two processing chambers.

A container 14 is arranged at the outlet of drum 1 in a conventional manner for collecting the product delivered from the processing chamber 13 and making the product available for further processing. The container 14 is hence cyclically filled in synchronism with the displacement of the longitudinal conveyor 3 in the direction of arrow 4.

Figure 2:
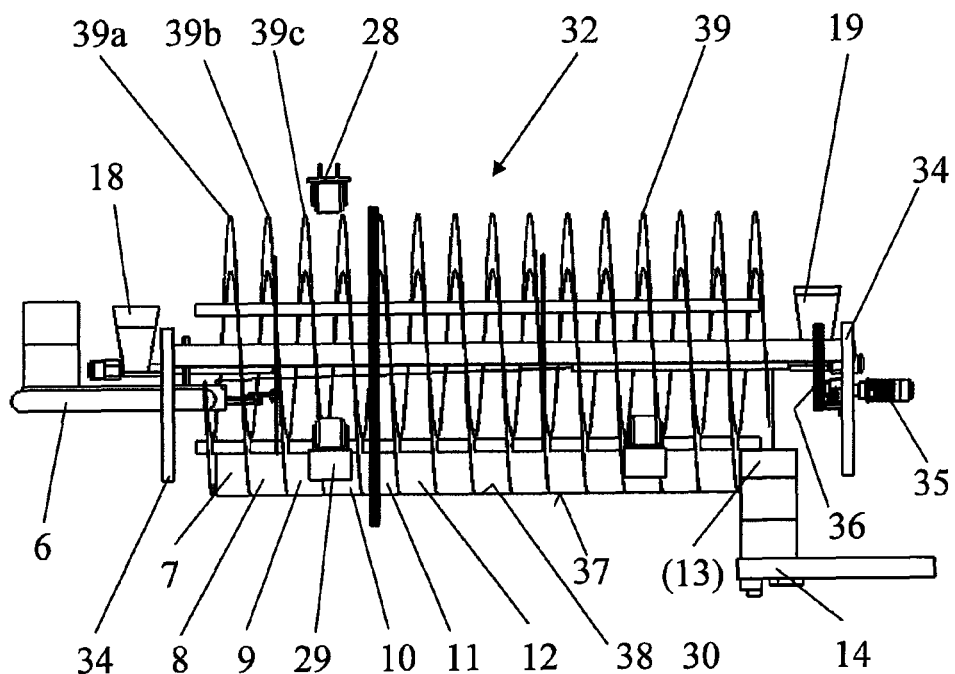
FIG. 2 shows schematically the spiral conveyor with the drum omitted.

FIG. 2 shows an embodiment for this type of longitudinal conveyor 3, implemented here as a spiral conveyor 32. The spiral conveyor 32 is non-rotatably connected with a central shaft extending through the drum 1.

The drum 1 has been omitted for clarity of the drawing. As can be seen, the aforedescribed processing chambers 7-19 are formed between the individual spiral tips 39a-c and the inner circumference of the drum 1.

The shaft is rotatably received by two bearings 34 located outside the drum 1 and is rotatably driven via a drive 35 and a flange-mounted gear 36.

The bottom 37 of the drum 1 is indicated in the drawing only in form of a solid line.

Accordingly, a rotary gap 38 is created between the drum bottom 37 and the corresponding spiral tip 39.

Figure 3:
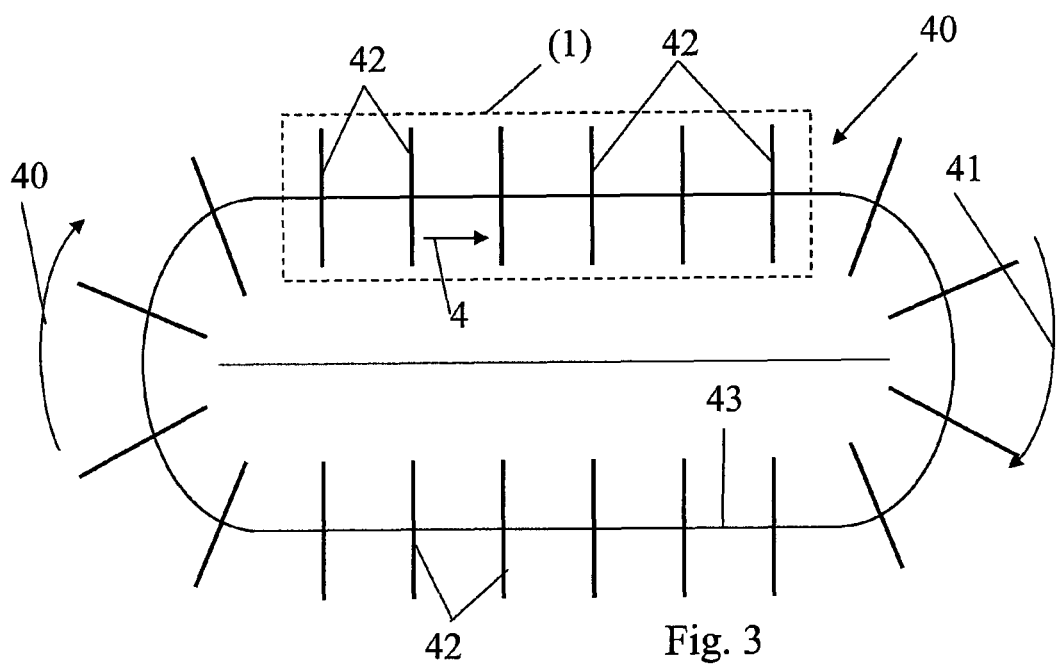
FIG. 3 shows a second embodiment of a longitudinal conveyor implemented as an endless belt conveyor.

FIG. 3 shows another embodiment of a longitudinal conveyor 3 implemented as a disk conveyor 40.

The drum 1 is shown only schematically, as are the individual disks 42 of the disk conveyor 40, which are movable through the drum 1 in the direction of arrow 4 and which are, for example, attached with a mutual spacing on a connecting bar 43. The disk conveyor 40 is hence configured as an endless belt which revolves in the direction of the arrows 41 and moves the corresponding spaced-apart, mutually parallel disks 42 through the drums 1 in the direction of arrow 4.

The disks themselves do not rotate, but are pushed or pulled in the axial direction through the drum. They need not fill the entire diameter of the drum. Instead, it is sufficient to use only a semi-disk or the like which, for example, fills the bottom cross-section of the drum, where it entrains the deposited material and transports the material, when desired, to the adjacent processing station.

With this embodiment, the supply lines for the individual processing stations can advantageously be routed through the upper half of the drum.

FIG. 4 shows additional details of the arrangement of the spiral conveyor 32 in drum 1.

The entire apparatus is hereby arranged in a frame 16 which has one or several guide rails, on which one or several shifting drives 45 for the individual processing heads 28-31 are arranged.

The respective processing head 28-31 can then be moved by the shifting drive 45 into any processing chamber 7-13 in the interior space of the drum 1.

The shaft 33 of the spiral conveyor 32 is driven in the direction of arrow 47.

FIG. 4 also indicates schematically that not only a single spiral conveyor may be provided, but that also two or several spiral conveyors 32a, 32b can be employed.

For example, the first spiral conveyor 32a extends from the inlet side of the drum 1 to approximately the central region where the separation plane 46 is indicated.

Another spiral conveyor 32b is arranged downstream of the separation plane toward the outlet of the drum. The two spiral conveyors 32a, 32b can be driven in the direction of arrows 47 using different rotary drives and/or with different rotation speeds.

The spiral of the continuous spiral conveyor 32 or the individual spiral conveyors 32a, 32b can also have different pitches so as to vary the dimensions of the processing chambers in the interior space of the drum 1.

FIG. 5 shows the outlet side of the drum. As can be seen, several guide rails 44 with associated shifting drives 45 can be provided, and the aforementioned supply lines 22-25 with the associated processing heads 28, 31 can be freely movable in the interior space of the drum 1.

As also shown, the outer circumference of the drum is supported on the roller bearings 2, whereby an upper roller bearings can be adjustable in the direction of arrow 49.

Also shown is the inclined product bed of the product 5, when the drum is rotated, for example, in the direction of arrow 52.

A rotary drive of this type is shown in FIG. 6. It consists essentially of a toothed belt 51 which is looped over the outer periphery of the drum 1 and routed over a drive motor 50 and optionally via a gear and associated tensioning and idle pulleys.

The rotary drive of the spiral conveyor 32 will be described in more detail with reference to FIGS. 7, 8, and 9.

As seen in FIG. 4, the individual spirals of the spiral conveyor can be stabilized relative to one another by support plates 48 extending the axial direction, which makes the spiral conveyor 32 stable and deflection-resistant.

Figure 7:
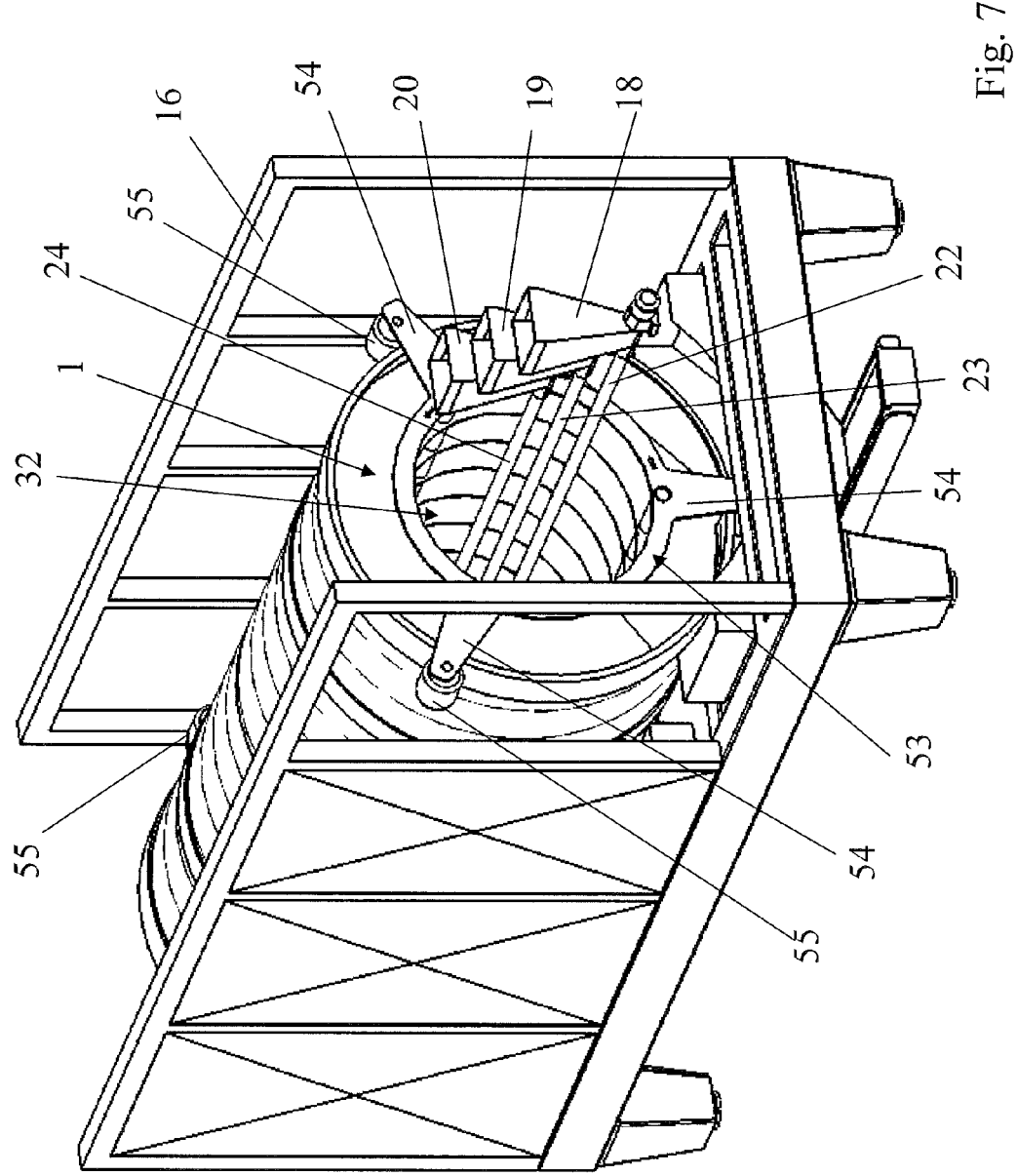
FIG. 7 shows schematically the dragée apparatus with a first embodiment for support of the spiral conveyor.
Figure 8:
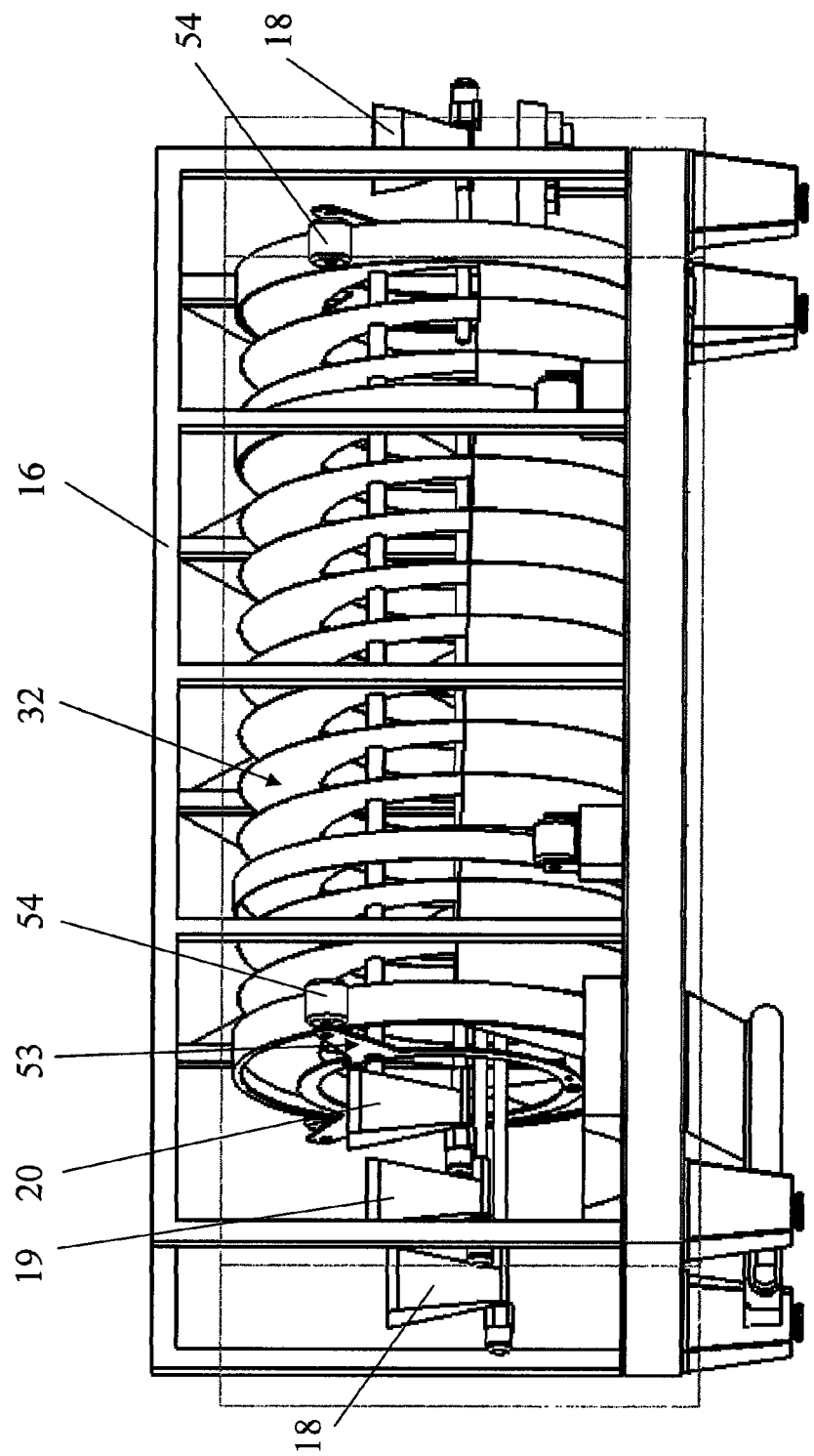
FIG. 8 shows the embodiment of FIG. 7 with additional details.

FIGS. 7 and 8 show, unlike the central support shown in FIG. 2, support of the spiral conveyor 32 in form of a spider bearing 53 that rolls off a front face of the drum. The spider bearing 53 consists of three outwardly extending legs 54 which are uniformly distributed around the periphery. Each of the outer free ends of the spider bearing 53 includes a corresponding roller 55 which contacts the outer periphery of the drum 1. The spider bearing 53 is non-rotatably connected with the spiral conveyor 32.

Advantageously, with this type of bearing support, the interior space of the drum 1 is completely devoid of built-in components (for example the shaft 33). This makes it easier to move the processing apparatus 15 with the different processing heads 28-32 in the interior space of the drum 1 and thereby supply the different processing chambers 9-13 individually.

FIG. 8 shows the arrangement of the spiral conveyor, with the drum omitted from the figure for the sake of clarity.

Figure 9:
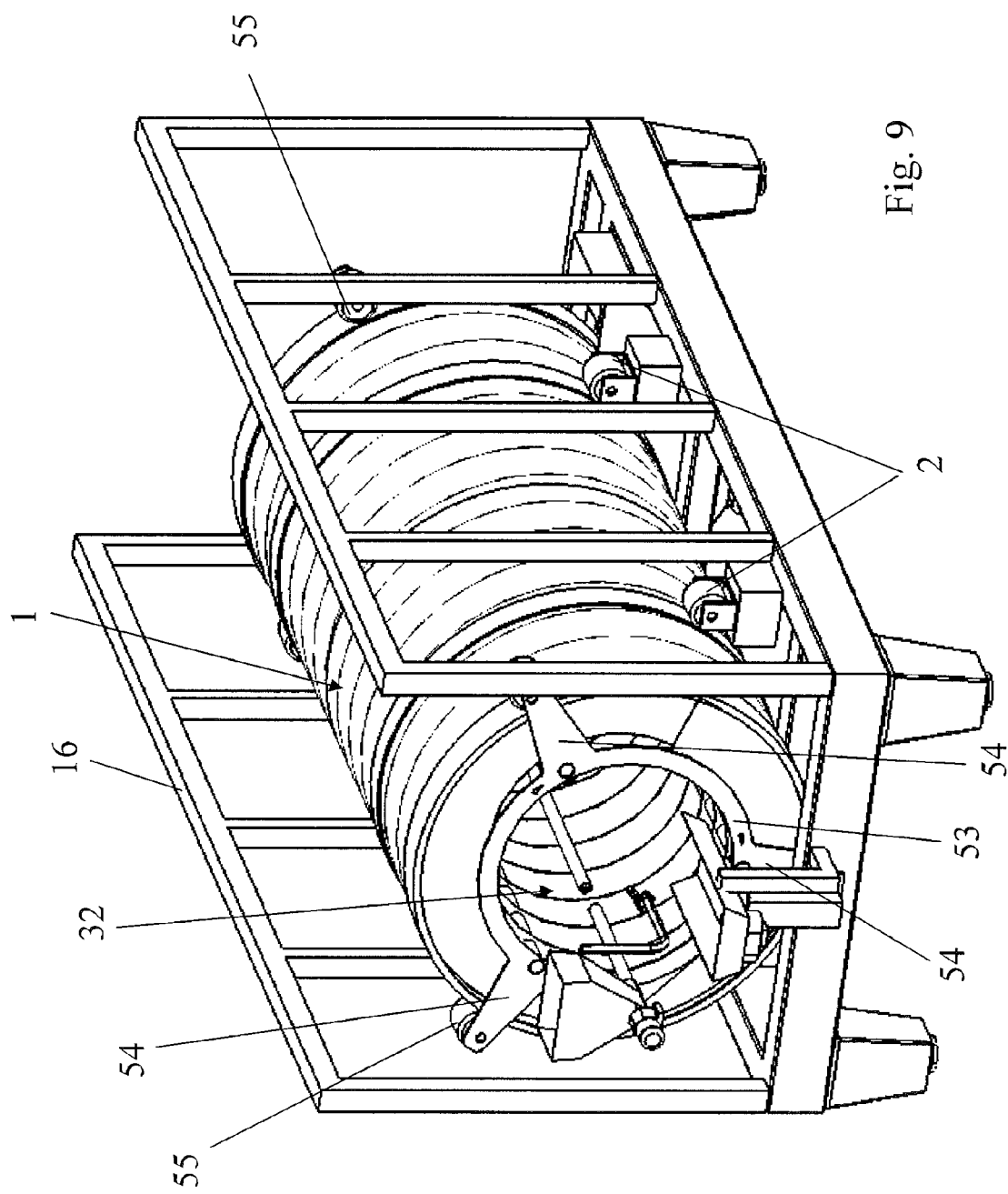
FIG. 9 shows an embodiment modified from that of FIG. 7.

FIG. 9 shows a perspective view which is rotated in relation to FIG. 7.

In another embodiment according to the invention (not shown), the spiral conveyor 32 with the aforedescribed shaft 33 is centrally supported instead with the aforementioned spider bearing 53. The shaft 33 is hereby received in bearings 43 arranged on the respective end faces, with the bearings 34 arranged on a stationary support.

The roller bearings 2 which rotatably support the drum are also arranged on a stationary frame.

It would also be feasible to reverse the transport direction of the longitudinal conveyor 3 indicated by arrow 4 and to transport the product instead from the outlet side to the inlet side.

The transport direction can also be reversed during the processing operation.

Moreover, the transport speed between the individual process steps can be changed if desired.

Implementing the longitudinal conveyor as a spiral conveyor simplifies the apparatus significantly. The spiral conveyor can be easily replaced and exchanged against other spiral conveyors (for example with a steeper slope). It would then be possible to implement, for example, only five or six process chambers with a greater capacity instead of the 13 process chambers shown in FIG. 1.

Alternatively, the pitch of the spiral conveyor could be selected to form only two separate process chambers in the drum.

A longitudinal conveyor in the form of a shifting drive, as shown in FIG. 3, can be used instead of the rotary drive of the spiral conveyor.

In the following, another embodiment will be described which allows the passageway connecting individual chambers to be opened and closed, as desired.

Figure 10:
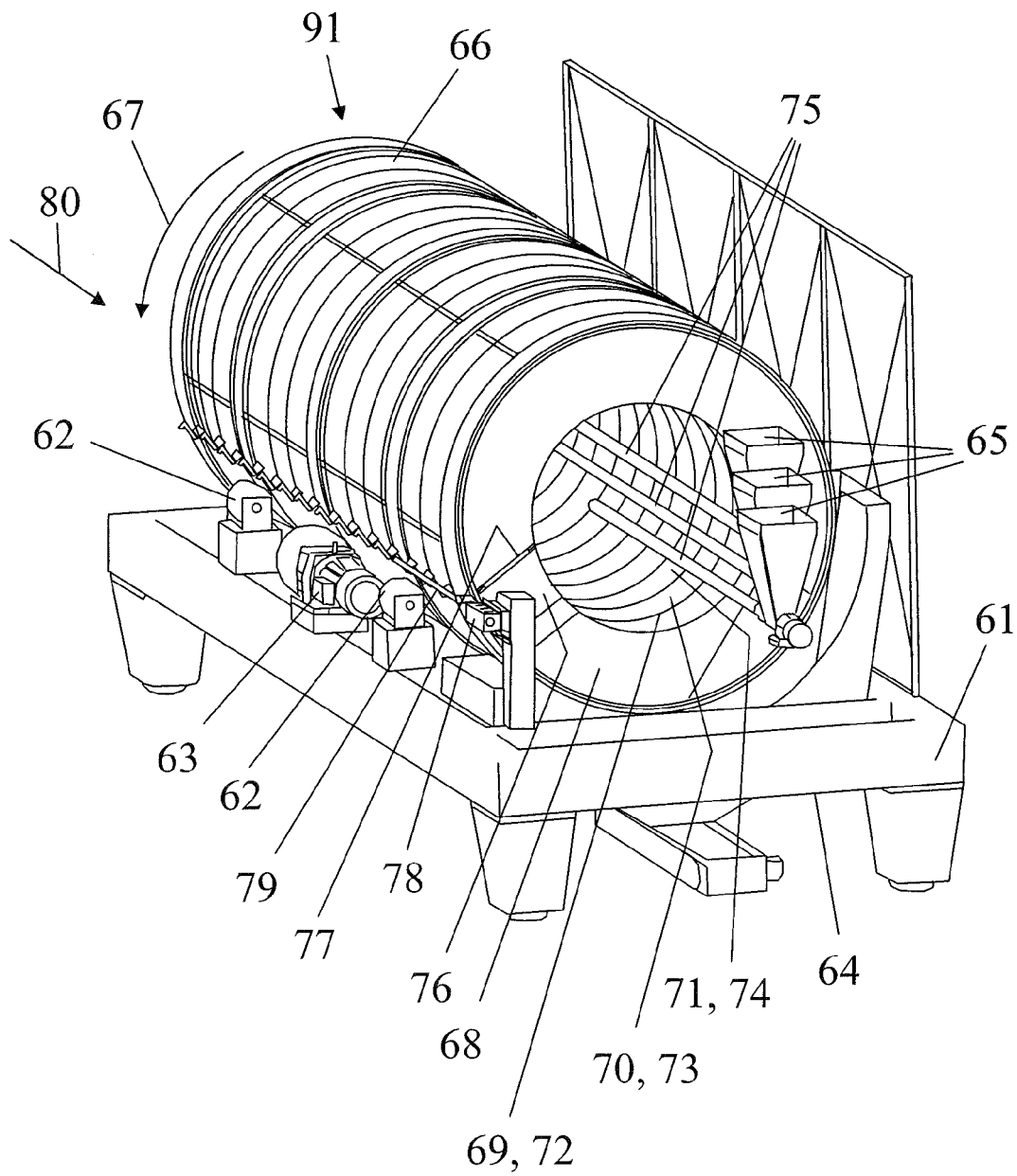
FIG. 10 shows schematically a drum as seen from the delivery side.

FIG. 10 shows a drum 91 which is rotatably supported on a machine frame 61.

A number of spaced-apart guide rollers 62 contact the outside jacket of the drum 66. The drum 91 is rotatably driven, for example, in the direction of arrow 67 by a drive 63 which has an associated drive roller in rotational engagement with an associated bearing race formed on the outer periphery of the drum jacket 66.

A number of containers 65 connected to pipes 75 extend into the interior space of the drum.

The containers 65 contain suitable coating materials, liquids and other materials which are supplied via the pipes 75 to the individual chambers 72, 73, 74.

The interior space of the drum 91 is divided into several separate chambers 72-74. This is accomplished by arranging partition disks 68, 69, 17, 71, whereby each partition disks is in the form of a circular ring which is fixedly and sealingly connected with the inner circumference of the drum jacket 66.

The plane of each partition disk 70 is preferably perpendicular to the drum jacket 66.

The partition disks 70 can also be oriented at an angle to the drum jacket 66.

A delivery device 64 is provided on the outlet end below the drum 91.

The material is introduced from the opposite side of the drum in the direction of arrow 80.

Importantly, each partition disk 66-71 includes a passageway which is closed by a suitable pivoting baffle 76. The pivot axis 77 of the pivoting baffle 76 is oriented perpendicular to the drum jacket 66.

A pivot drive 78 is provided which operates on a pushrod 79 that is displaceable in the direction of the longitudinal axis of the drum 91.

This pushrod 79 operates, if possible, all pivoting baffles 76, so that all the pivoting baffles 76 can be switched by the pivot drive 78 from their open position to the closed position and vice versa.

Alternatively, because the guide rollers 62 and the drive 63 are in contact with the outer jacket of the drum, several pivot drives 78 may be provided, because it would be impossible to implement an externally mounted pushrod 79 which is non-rotatably connected with the drum and rotates with the drum and extends over the entire length of the drum 91. These machine components would strike a pushrod 79 that extends over the entire length of the drum and rotates with the drum.

For this reason, several pushrods are implemented which are operated by one or several pivot drives 78.

Alternatively, the pivot drive 78 for all pivoting baffles 76 could be actuated pneumatically, hydraulically or by a fluid, thereby eliminating a pushrod 79.

Figure 11:
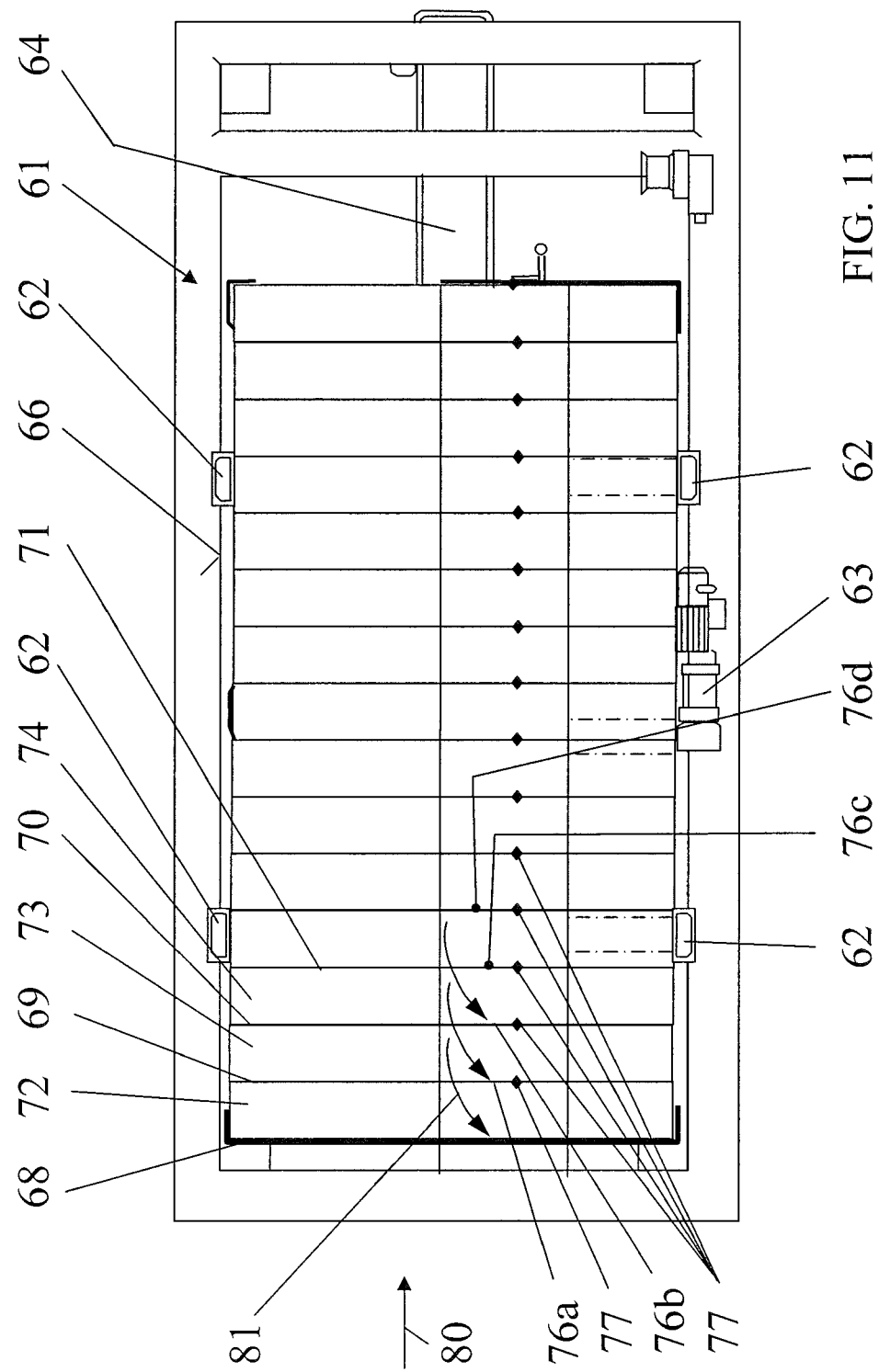
FIG. 11 shows a cross-section through the drum of FIG. 1.

FIG. 10 shows the outlet side of the drum 91 and also the respective chambers 72-74. FIG. 11 shows only the chambers 72-74 on the inlet side in detail, although many additional chambers may exist in the drum, which are also separated by partition disks 68-71.

A first charge is processed by supplying the charge in the direction of arrow 80 via a suitable feed device to the first chamber 72 located on the inlet side. The charge can be processed in this chamber in any desirable manner. At the end of the processing time, all pivoting baffles 76a, b, c, d are pivoted at once in the direction of arrow 81, arriving at the state depicted in FIG. 14.

This means that the free pivotable end of each pivoting baffle 76 is moved into the unobstructed opening of the respective chamber 72-74, thereby preventing additional material from escaping through the pivoting baffle 76 during further rotation of the drum. The additional material therefore remains in the same chamber.

Each pivoting baffle 76a, b, c, d acts a diverter, so that the charge previously contained in chamber 72 is transferred in the direction of arrow 82 through the open pivoting baffle 76a into the next chamber 73.

This transfer occurs exactly during a single revolution of the drum.

After a complete revolution of the drum, the pivoting baffles 78a-d are again closed and the operative state shown in FIG. 11 is restored.

A new charge is supplied to the now empty chamber 72 in the direction of arrow 80, whereas the charge previously processed in chamber 72 is now further processed in chamber 73.

Figure 14:
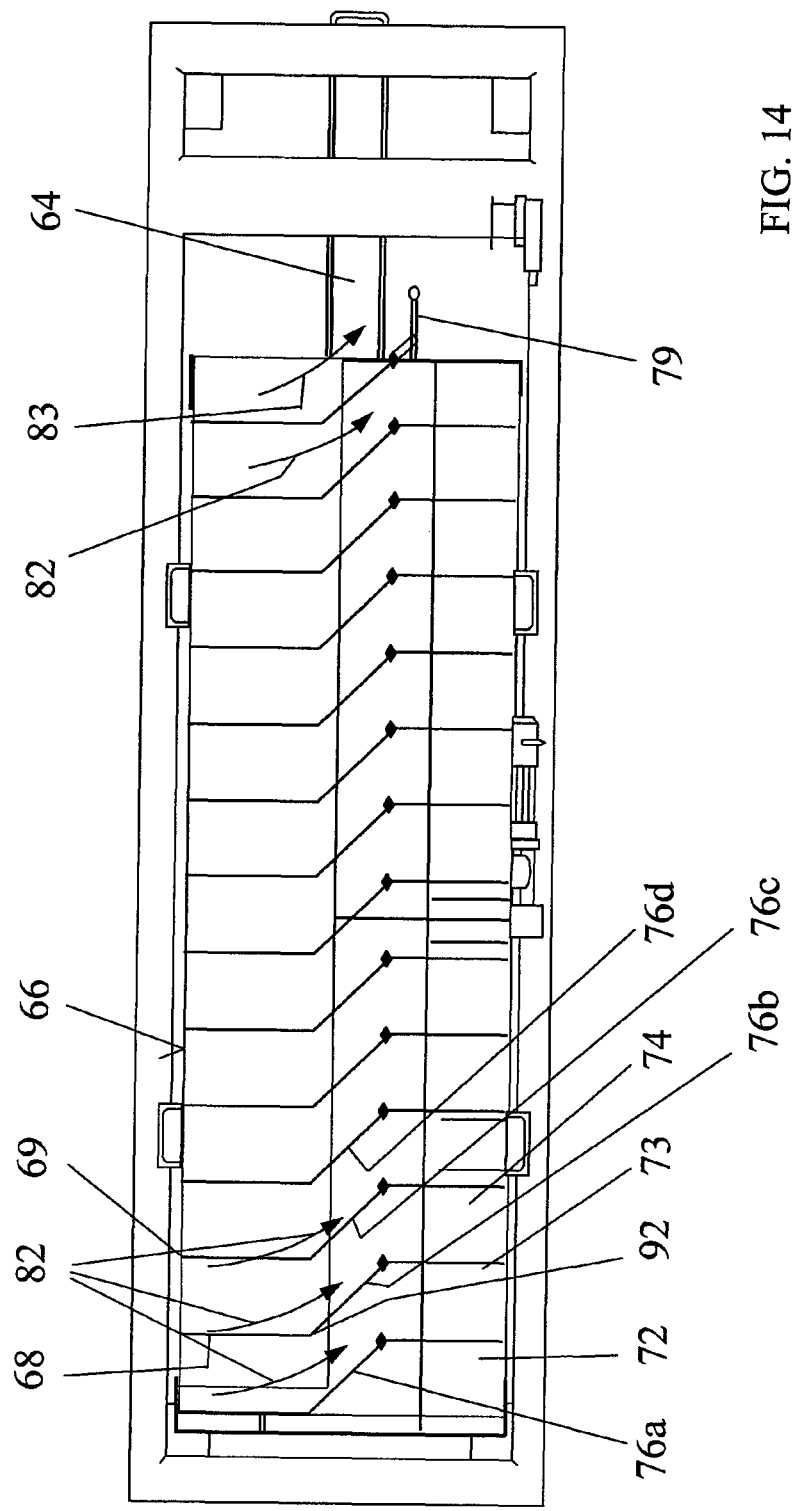
FIG. 14 shows schematically a cross-section through the drum in transport mode.

After a processing time of arbitrary duration, all pivoting baffles 76 are now opened synchronously, attaining the pivoted positions depicted in FIG. 14.

The charge processed in chamber 73 is now transferred via the pivoting baffle 76b into the chamber 74 and the charge previously contained in chamber 72 is transferred via the pivoting baffle 76a into the now empty chamber 73.

All pivoting baffles 76 are then closed again and a new operating cycle according to FIG. 11 begins.

At the end of all process steps, the last charge is contained in the last chamber at the outlet side and is delivered to a delivery device in the direction of arrow 83.

Figure 12:
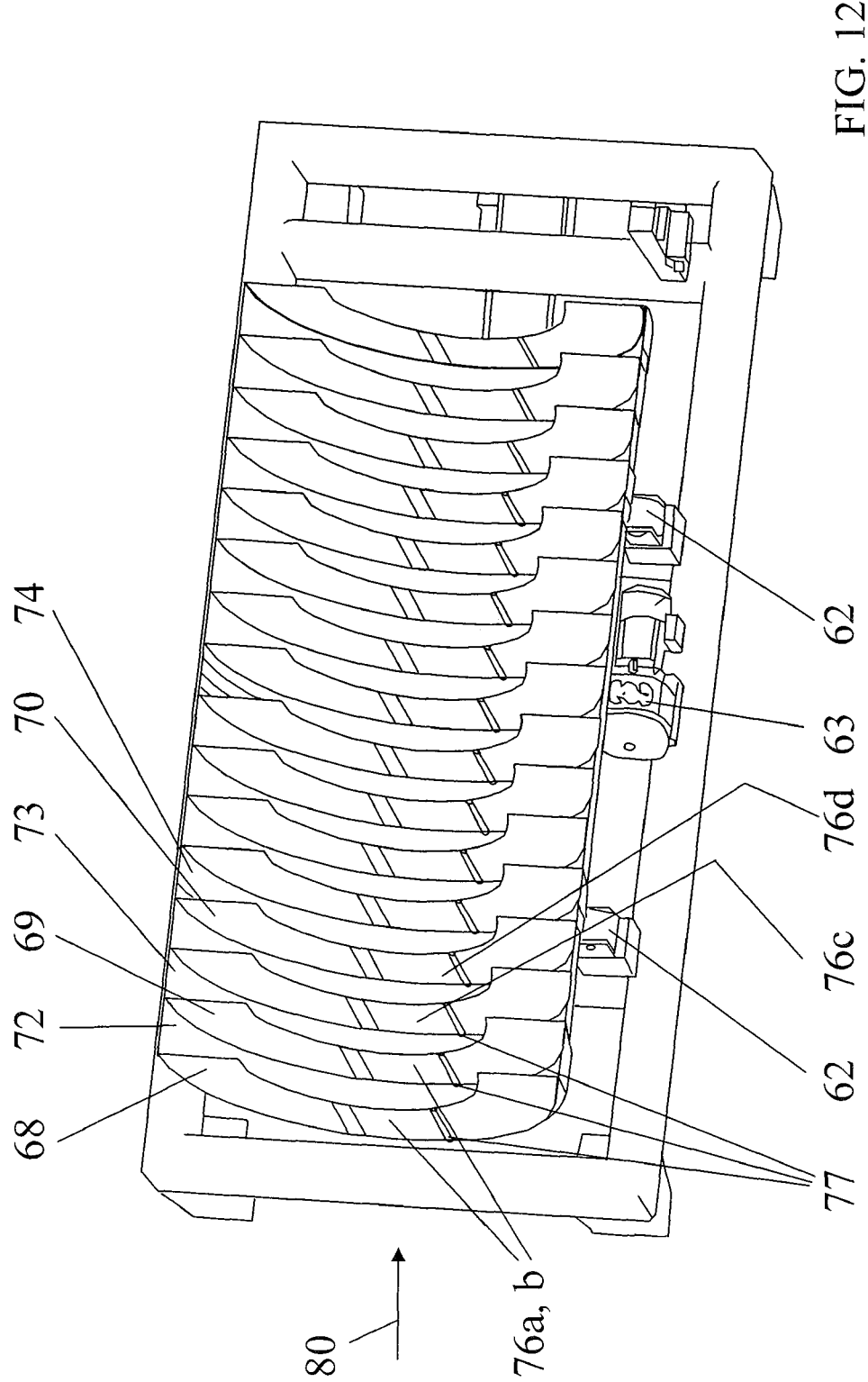
FIG. 12 shows in a perspective view the individual chambers in processing mode, with the drum jacket omitted.

FIG. 12 shows in a perspective view the individual partition disks 68-71, with the drum jacket omitted to simplify the drawing. The outer periphery of the partition disks 68-71 is non-rotatably and sealingly connected with the inside of the drum jacket 66.

As seen from FIG. 12, the pivoting baffles 76a-d are inserted aligned and flush with the corresponding partition disks 68-71 so as to sealingly close the passageways in the partition disks.

Figure 13:
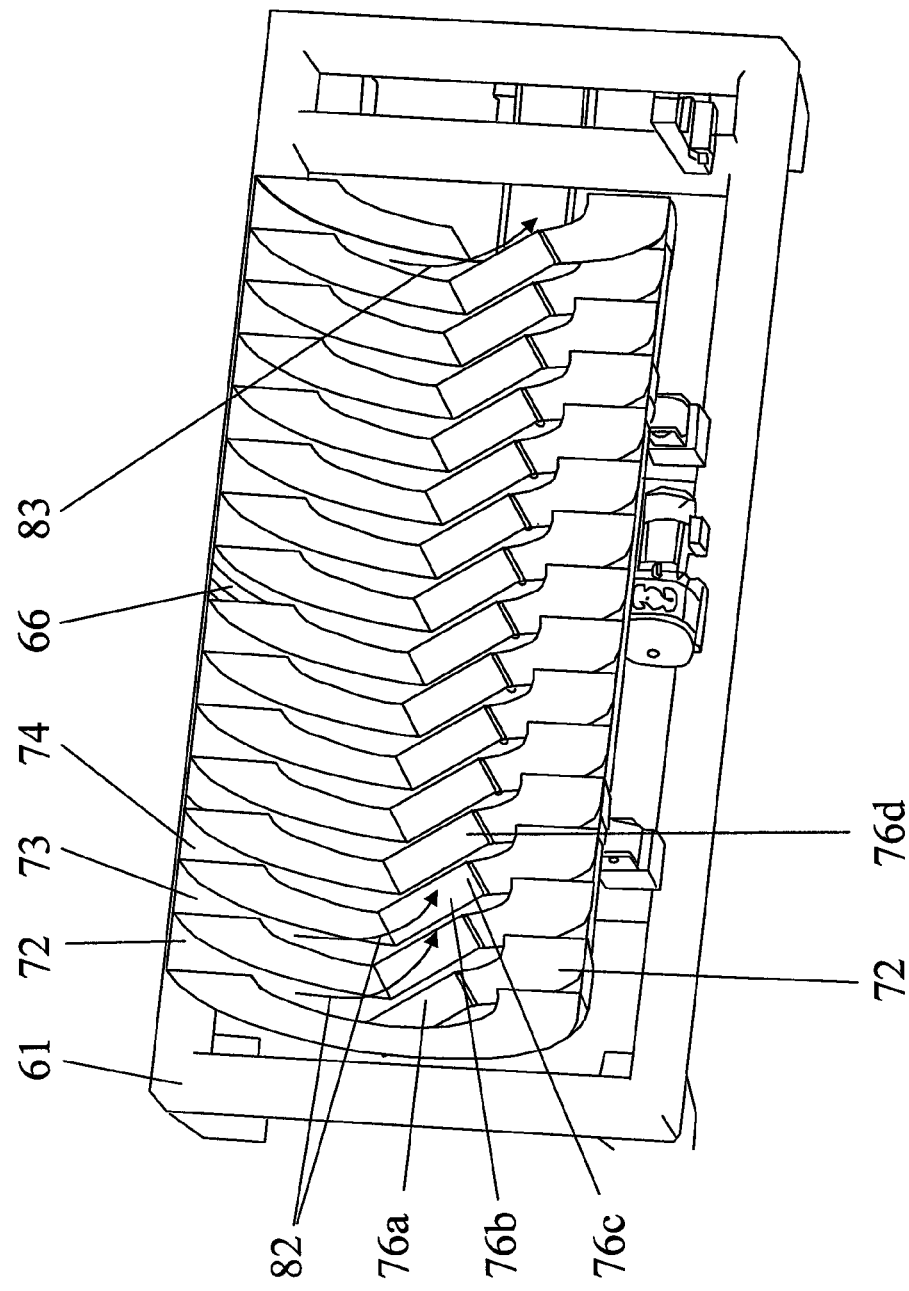
FIG. 13 is identical to FIG. 12, however in transport mode.

FIG. 13 shows the transport operation when the individual pivoting baffles 76a-d are open and transfer to the next adjacent chamber takes place via the respective open pivoting baffle.

Importantly, the open pivoting baffle 76 should cover the corresponding unobstructed width of the chambers 72-74 and provide the most effective seal against the drum jacket to avert material residues in the respective chamber 72-74. The goal is to transfer all the material into the adjacent chamber via the open pivoting baffle 76.

This is also illustrated in FIG. 14 which shows, for example, the free pivotable end 92 of pivoting baffle 76b associated with the partition disk 69 sealingly contacting the inside of the partition disk 68, so as all the material is transferred from chamber 73 into chamber 74.

Figure 15:
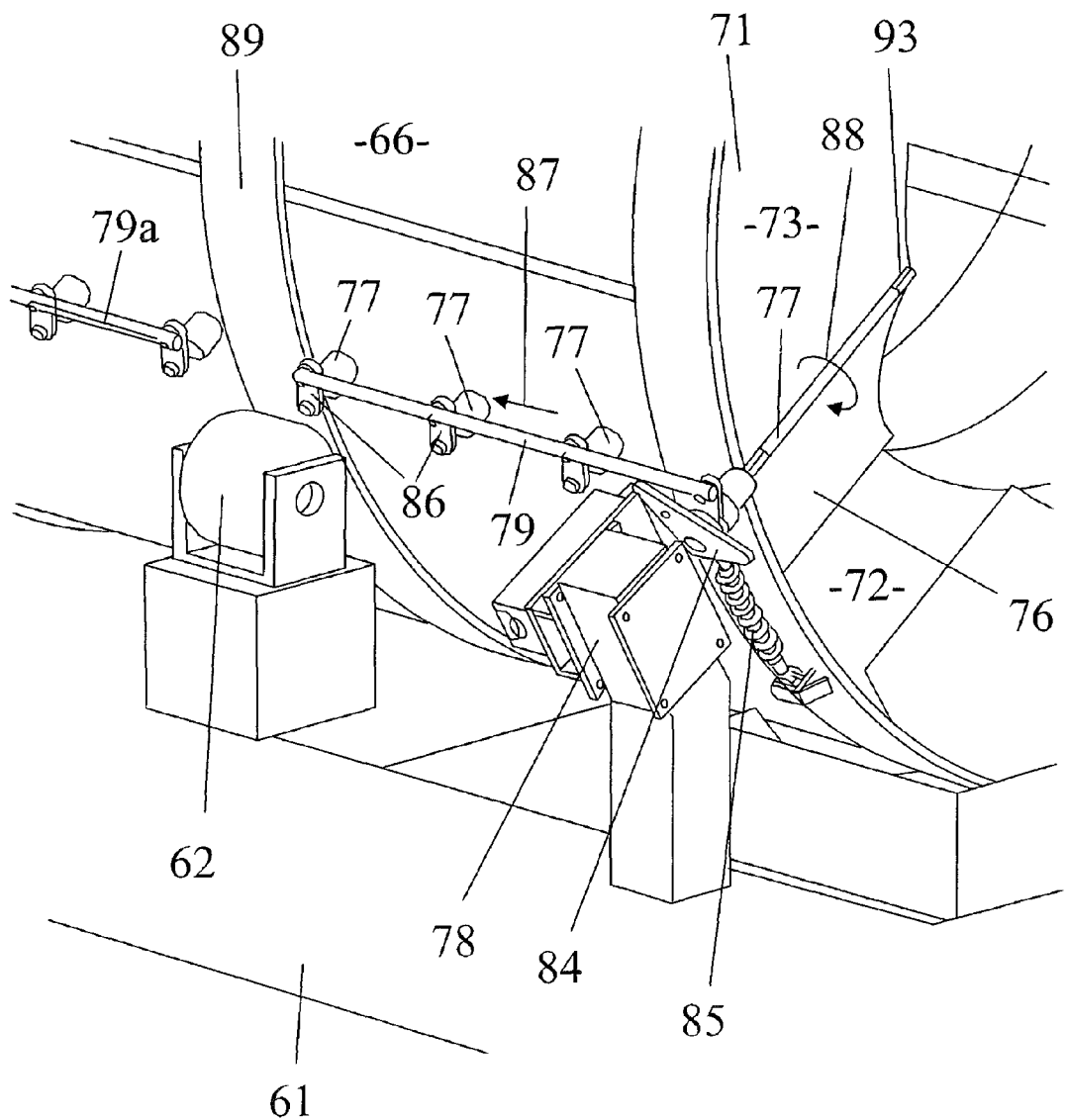
FIG. 15 shows in a perspective view a first embodiment of the pivot drive for the pivoting baffles.

FIG. 15 shows a first embodiment for the pivot drive of the respective pivoting baffles.

As can be seen, a shaft 93 is associated with each pivoting baffle 76 and forms the pivot axle 77 for pivoting the suitable flap 76 in the direction of arrow 88.

The free end of shaft 93 extends through the drum jacket 66 and is non-rotatably connected with the free end of an eccentric lever 86. The other end of the eccentric lever 86 is connected with the pushrod 79.

The pushrod 79 is driven longitudinally in the direction of arrow 87 by a reversing lever 84 which is pretensioned by a spring 85 in a defined position.

The reversing lever 84 is instantaneously shifted by a change-over cam, thereby moving the pushrod 79 in the direction of arrow 87 and switching all pivoting baffles 79 from the closed position into the open position.

The same description applies to the adjacent pushrod 79a, which has a separate pivot drive.

FIG. 15 shows that the pushrods 79, 79a, which rotate with the drum, must be separated in the region of the bearing race 89 for the guide rollers 62.

Figure 16:
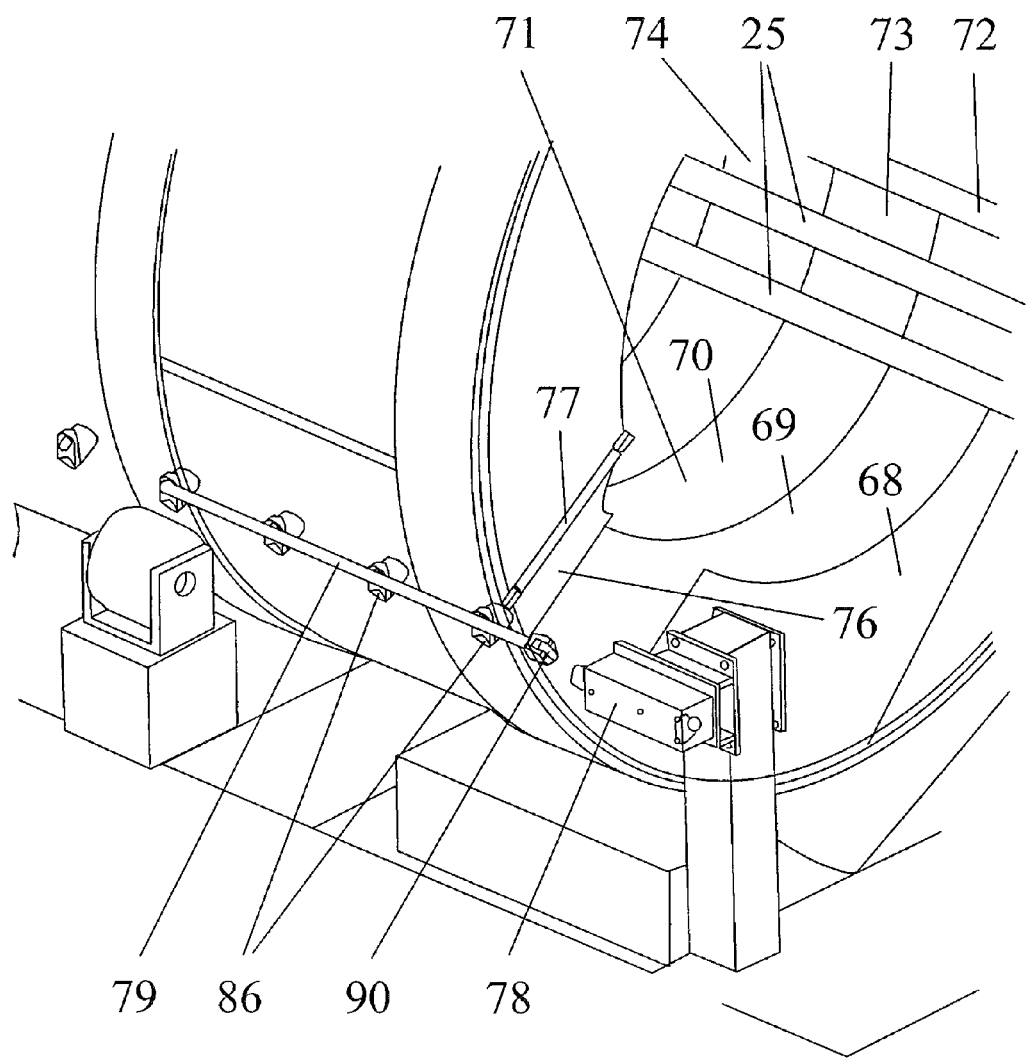
FIG. 16 shows a second embodiment of the pivot drive for the pivoting baffles.

FIG. 16 shows an additional embodiment of the shifting drive 78, wherein a billy-roller 90 which cooperates with a corresponding slide in the pivot drive 78 is arranged on the front free end of the pushrod 79.

In a third embodiment, which is not shown in a drawing, the pushrods 79, 79a can be displaced by a forced control, with the pushrods 79, 79a passing over a stationary curve which moves the pushrod as necessary to one or the other position.

It is important in all embodiments that the individual charges are processed individually in separate sealed chambers 72-74, with the material being transported from one chamber to an adjacent chamber only as desired.

The invention claimed is:

1. An apparatus for continuous coating of cores with a dragée-making apparatus comprising
   at least one rotatably driven drum (1) in which the product (5) is coated with one or several coating materials, and
   at least one coating structure,
   at least one entrance and exit from the drum,
   structure to supply the cores within the drum,
   at least one drive or motor for a drum and the conveyor within the drum,
   at least one longitudinal conveyor (3, 32; 76) is arranged in the drum (1; 91), and wherein with the conveyor (3, 32; 76) the product (5) is transported in a cyclical transport mode in form of individual charges through the drum (1, 91) in the axial direction, and
   wherein the longitudinal conveyor is implemented as a rotatably driven spiral conveyor (32), and
   wherein several independently driven spiral conveyors (32a, 32b) are arranged in the drum (1; 91).

2. The apparatus according to claim 1, wherein the conveying elements of the longitudinal conveyor form the individual processing chambers (7-13; 72-74) in cooperation with the inner wall of the drum (1, 91).

3. The apparatus according to claim 1, wherein the outer circumference of the longitudinal conveyor forms a rotating gap (38) relative to the inner circumference of the drum (1, 91), with the gap being smaller then the diameter of the cores to be coated.

* * * * *